(12) United States Patent
Swineford et al.

(10) Patent No.: US 9,098,382 B2
(45) Date of Patent: Aug. 4, 2015

(54) METHOD AND SYSTEM TO MANAGE DOCUMENT WORKFLOW COMMUNICATION

(75) Inventors: Randy L. Swineford, San Jose, CA (US); Patrick R. Wibbeler, Rocklin, CA (US)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1846 days.

(21) Appl. No.: 12/022,241

(22) Filed: Jan. 30, 2008

(65) Prior Publication Data

US 2014/0032780 A1    Jan. 30, 2014

(51) Int. Cl.
| G06F 15/16 | (2006.01) |
| G06F 15/177 | (2006.01) |
| G06F 3/00 | (2006.01) |
| G06F 11/00 | (2006.01) |
| G06F 17/30 | (2006.01) |

(52) U.S. Cl.
CPC ............... *G06F 11/00* (2013.01); *G06F 17/30* (2013.01)

(58) Field of Classification Search
USPC .................. 709/201, 203, 220, 221, 222, 233
See application file for complete search history.

(56) References Cited

U.S. PATENT DOCUMENTS

| 7,596,543 B2* | 9/2009 | Lange et al. ...................... 707/1 |
| 2004/0111302 A1* | 6/2004 | Falk et al. ......................... 705/4 |
| 2005/0027544 A1* | 2/2005 | Newstead et al. ................. 705/1 |
| 2005/0039048 A1* | 2/2005 | Tosey ............................ 713/201 |
| 2006/0069599 A1* | 3/2006 | Hatoun et al. .................... 705/8 |

* cited by examiner

*Primary Examiner* — Ninos Donabed
*Assistant Examiner* — Farrukh Hussain
(74) *Attorney, Agent, or Firm* — Shook, Hardy & Bacon L.L.P.

(57) ABSTRACT

A method and system to manage document workflow communication is provided. The system may include a polling module to poll a server at an active polling rate to obtain resources associated with a workflow of an electronic document, a ramp-down trigger detector to detect a workflow ramp-down trigger event, and a throttling module to initiate a ramp down of the polling of the server according to a ramp-down schedule. In one example embodiment, the electronic document workflow may be associated with collaborative review of the electronic document.

21 Claims, 4 Drawing Sheets

METHOD AND SYSTEM TO MANAGE DOCUMENT WORKFLOW COMMUNICATION

TECHNICAL FIELD

This application relates to a method and system to manage document workflow communication.

BACKGROUND

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Many documents are generated in today's electronic society. These documents are often created by one individual, but are subject of review by others. Documents to be reviewed are commonly created and then forwarded to others for review. Reviewers typically make corrections and additions to the document under review and may also add comments, markups, and other annotations, e.g., utilizing a viewing application, such as Adobe® Acrobat® software. The modified document is then sent back to the document creator.

BRIEF DESCRIPTION OF DRAWINGS

Embodiments are illustrated by way of example and not limitation in the figures of the accompanying drawings, in which like references indicate similar elements and in which.

DETAILED DESCRIPTION

Figure 1:
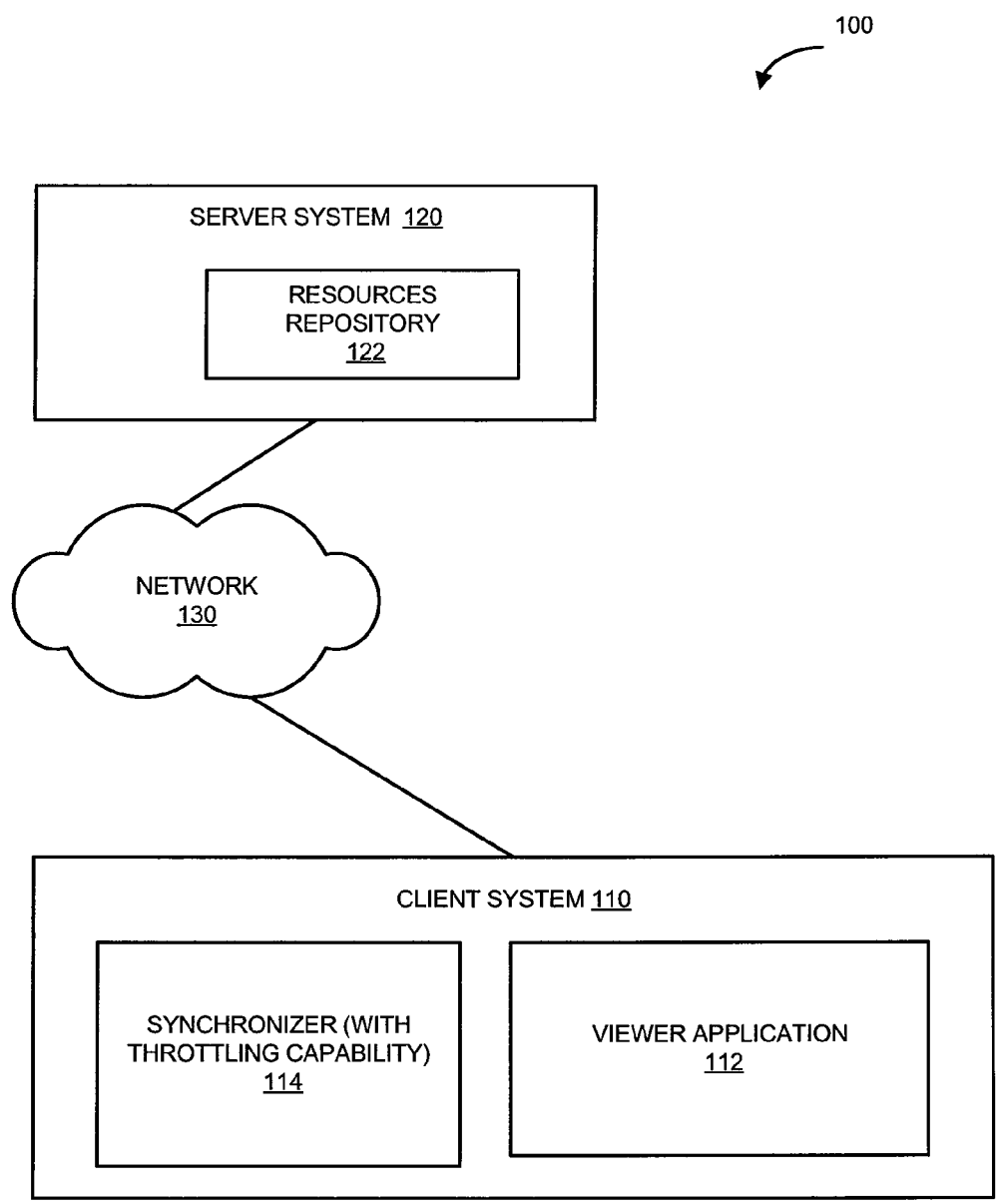
FIG. 1 shows a network environment within which a method and system to manage document workflow communication is implemented, in accordance with an example embodiment.

An example collaborative workflow, or an electronic document workflow, may be described as a process by which users (workflow participants) interact with an electronic document by manipulating their respective instances of the document and, in some workflows, being permitted to view and react to input originated from other participants. It will be noted that a user who is an initiator of a workflow may also act as a workflow participant, e.g., by providing changes to the document. One example of a document workflow is a shared review of an electronic document. A data collection process via an electronic form is another example. A document workflow may transition through different states between the time a workflow is initiated and the time the workflow is terminated. A state change may be caused by a comment being added by a participant, by reaching a deadline set by the initiator and indicating a target date for completing the associated collaborative process, by detecting data provided via one or more form fields, etc. A document workflow may be facilitated by a viewer application. A viewer application, such as Adobe® Acrobat® software may have authoring capabilities and may operate in conjunction with a synchronizer. A synchronizer, in one example embodiment, is configured to synchronize workflow status with the server that stores workflow data.

Communication with the server may be initiated from a client system that hosts a viewer application and the associated synchronizer. In order to provide participants with regular workflow updates, the client system polls the server at a predetermined rate to obtain an updated workflow status. In some existing systems, the client continues to poll the server until the workflow is explicitly terminated by the initiator.

A system and method to manage electronic document workflow communication is described to gradually decrease (or ramp down) communication with the associated server for a particular workflow without disrupting the user's experience. In one example embodiment, a synchronizer module (or merely a synchronizer) that runs on a client system that hosts a viewer application may be configured to monitor workflow events and adjust the polling rate based on the detected workflow state. For example, where the initiator of a document workflow provided a deadline—a date at which the collaborative workflow should be completed by participants—the synchronizer may be configured to have a throttling capability to initiate and execute a ramp-down sequence to gradually decrease the polling rate in response to determining that the deadline was reached. As a result of a ramp-down sequence, the polling rate may reach a so-called suspended state where the synchronizer stops polling the server even if the associated workflow has not been terminated by the workflow initiator. The techniques designed to permit clients to actively back-off their poll rates based on need may be utilized advantageously to decrease the load on the server caused by one or more document workflows.

In some embodiments, a ramp-down sequence may be restarted, e.g., the polling rate may be reset to the rate that was used prior to reaching the deadline (an active polling rate), in response to an indication that the workflow is still receiving updates. For example, a decreased or even suspended polling rate may be reset to the associated active polling rate if a participant opens the document associated with the workflow. Example system and method to manage document workflow communication may be implemented in the context of a network environment, as discussed below. For the purposes of this description, the terms "electronic document" and "document" are used interchangeably.

FIG. 1 illustrates a network environment 100, within which system and method to manage document workflow communication may be implemented. As shown in FIG. 1, a client system 110 communicates with a server system 120 via a network 130. The client system may be utilized to obtain workflow data stored in a resource repository 122 associated with the server system 120. It will be noted, that the resource repository 122 may be located locally with respect to the server system 120 (as shown in FIG. 1), or it may be connected to the server system 120 via a communication link. The resource repository 122 may be implemented as a database, a file system, a content management system, or some other data store.

The communication network 130 may be a public network (e.g., the Internet, a wireless network, etc.) or a private network (e.g., LAN, WAN, Intranet, etc.). The client system 110 includes a viewer application 112 and an associated synchronizer 114. The viewer application 112, in one example embodiment, is Adobe® Acrobat® software. The synchronizer 114, which may be implemented as part of the viewer application 112, is configured to have throttling capability. An example embodiment of a synchronizer having throttling capability may be described with reference to FIG. 2.

Figure 2:
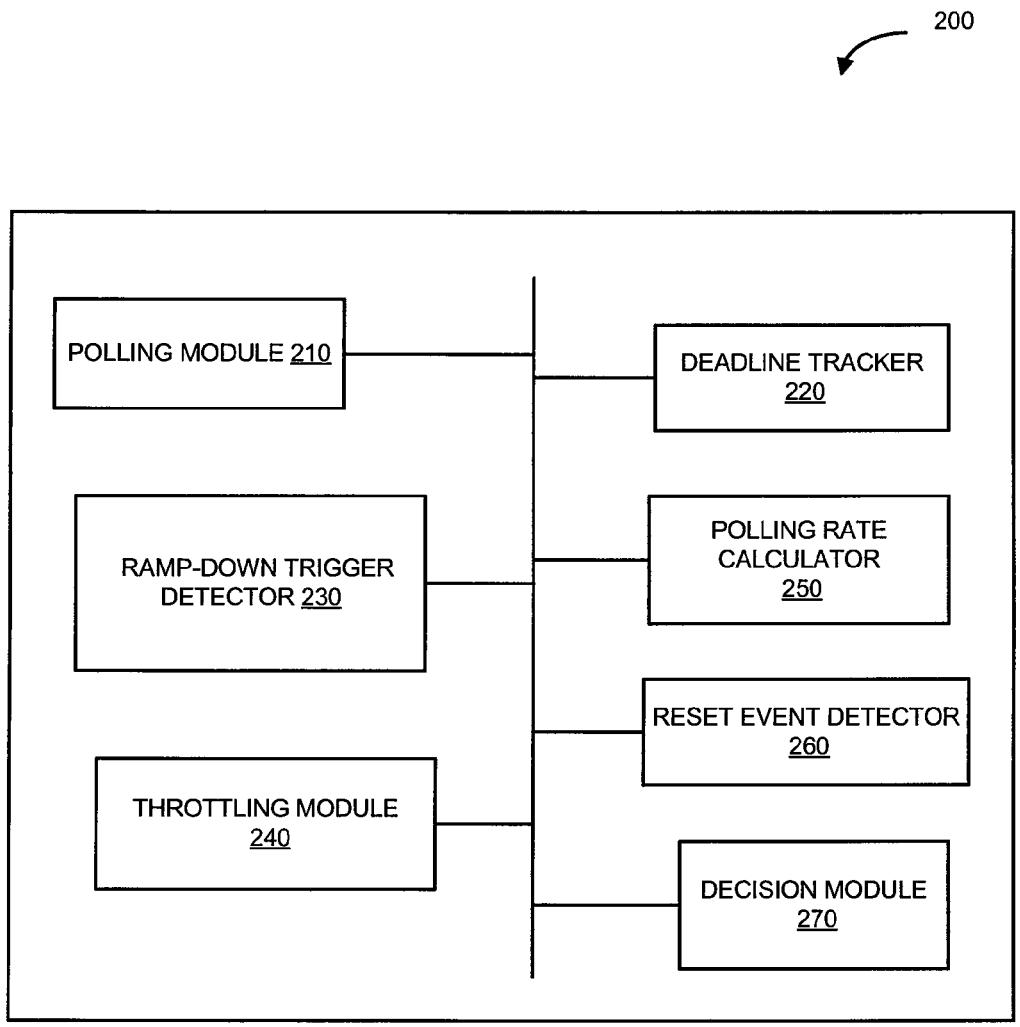
FIG. 2 is a block diagram illustrating a system to manage document workflow communication, in accordance with an example embodiment.

FIG. 2 is a block diagram illustrating a synchronizer 200, in accordance with an example embodiment. The synchronizer 200 may be configured to implement the throttling mechanism discussed above. The synchronizer 200, in one example embodiment, comprises a polling module 210, a ramp-down trigger detector 220, a deadline tracker 230, a throttling module 240, a polling rate calculator 250, a reset event detector 260, and a decision module 270.

The polling module 210 may be configured to poll a server, e.g., the server system 120 illustrated in FIG. 1 that stores workflow-related resources. The polling module 210 may poll the server at a polling rate referred to as an active rate. The polling module 210 may poll the server at a reduced polling rate during a ramp-down period. The ramp-down trigger detector 220 may be configured to detect an event indicating that the polling rate should be decreased. The ramp-down trigger detector 220 may cooperate with the deadline tracker 230 to determine whether a workflow deadline has been reached. The workflow deadline may be set by the initiator of the workflow to designate the target date/time, by which the workflow is to be completed. The adjustments to the polling rate may be performed by the throttling module 240. The throttling module 240 may utilize the polling rate calculator 250 to obtain information regarding a next polling rate.

The reset event detector 260 may be configured to determine an event that triggers the reset of a ramp-down period and the associated reset of the current polling rate to an active polling rate. Example reset events are discussed further below. An adjustment to the polling rate may be performed in response to an instruction originated from the decision module 270. The decision module 270, in one example embodiment, is configured to determine whether the polling rate is to be adjusted. Example operations performed by the synchronizer 200 may be described with reference to FIG. 3.

Figure 3:
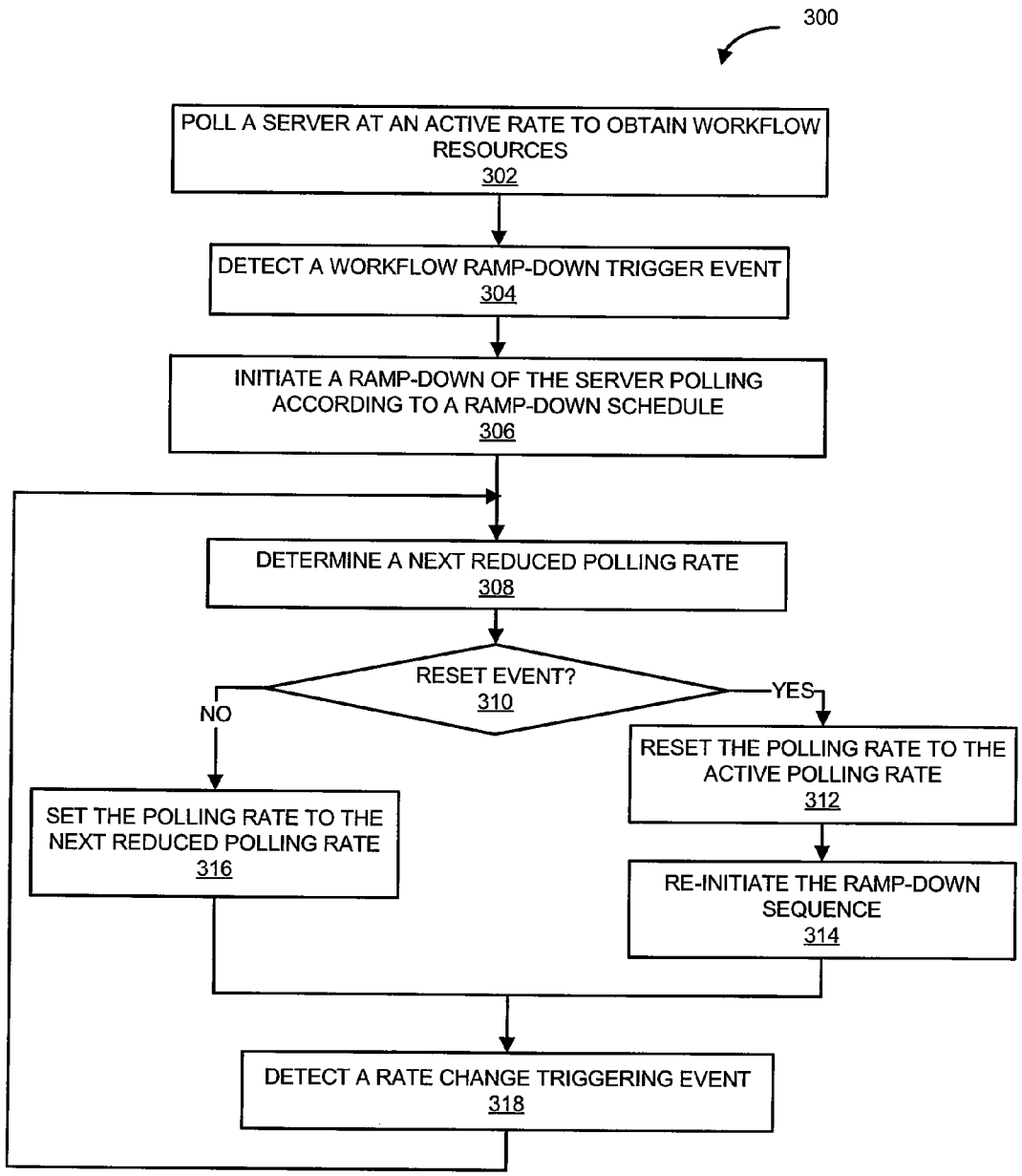
FIG. 3 is a flow chart illustrating a method to manage document workflow communication, in accordance with an example embodiment.

FIG. 3 is a flow chart illustrating a method 300 to manage document workflow communication, in accordance with an example embodiment. The method 300 may be performed by processing logic that may comprise hardware (e.g., dedicated logic, programmable logic, microcode, etc.), software (such as run on a general purpose computer system or a dedicated machine), or a combination of both. It will be noted, that, in an example embodiment, the processing logic may reside in any of the modules shown in FIG. 2 described above.

As mentioned above, a user, referred to as an initiator, may initiate a collaborative review workflow associated with an electronic document. In one example embodiment, a document that is the subject of the collaborative review and the associated workflow may be created in a Portable Document Format (PDF). The initiator may specify a deadline, e.g., the date and the time, by which the workflow needs to be completed. After the electronic document is distributed to participants, e.g., from a server configured to collect and store workflow data, the participant's respective synchronizers communicate with the server at a regular interval that may be referred to as an active polling rate. The active polling rate may be higher (e.g., every five minutes) when the electronic document that is the subject of the collaborative workflow is opened by a viewer application and lower (e.g., every thirty minutes) when it is not.

After a document workflow is initiated and the electronic document that is the subject of the workflow is distributed to participants, the polling module 210 polls a server at an active rate, at operation 302, to obtain resources associated with an electronic document. Resources, in one example embodiment, include comments or other modifications to the electronic document, Really Simple Syndication (RSS) feeds, forums data, form field data, etc.

At operation 304, the ramp-down trigger detector 220 detects an event indicating that the polling rate should be decreased, e.g., due to the participant's lack of interest in the workflow or due to lack of server responsiveness. The event detected at operation 304, termed a workflow ramp-down trigger event, may also be associated with the workflow reaching the workflow deadline set up by the initiator. In one example embodiment, the ramp-down trigger detector 220 cooperates with the deadline tracker 230 to determine that the deadline has been reached. When it is determined that the deadline has been reached or passed, in one example embodiment, the respective synchronizers of the clients participating in the workflow commence an automatic ramp-down of the number of communications transmitted to the server. In one example embodiment, when a workflow deadline has passed, it may be assumed that the participant's need to be immediately updated about the workflow state changes decreases over time.

In response to detecting the workflow ramp-down trigger event, the throttling module 240 initiates a ramp-down of the server polling, at operation 306. The ramp-down of the polling rate may be effectuated according to a predetermined schedule. For example, during the first 30 days after the deadline, synchronizers associated with respective viewing applications of participants may communicate every 2 days. After 30 days—once a week, after 60 days—once every 2 weeks. An example ramp-down period may be set at 90 days. When the set ramp-down period is completed, the workflow enters a so-called suspended state, where the synchronizer no longer communicates with the server.

At operation 308, the polling rate calculator 250 determines a next reduced polling rate. One example algorithm to determine a next polling rate during a ramp-down period is described below.

In one example embodiment, the day and time at which a ramp-down (or decay) process is set to begin may be expressed as follows.

DecayStart=DecayPeriodStart(latest of previous
  DecayStart, last time changes detected, last reset
  (given by client))+a grace period of 5 days As shown above, the decay of the polling rate commences five days after the determined starting time of the decay period. A parameter called "Decay Period Length" may be used to indicate how long from the ramp-down start the decay should continue until it ends with the suspended polling rate.

Prior to the beginning of the decay period, where the active polling rate is once every 60 minutes, a "next synchronization time" parameter may be set to 1 hour. When the ramp-down period ends, the "next synchronization time" parameter may be set to infinity to indicate that the synchronizer is to stop polling the server. During the ramp-down period, the next polling rate expressed in the "NumberOfDays" parameter may be calculated as follows.

NumberOfDays=2^((offset/decay period)*3)

"Offset" is the amount of time that passed from the beginning of a ramp-down period. "Decay period" is the length of the ramp-down period. Thus, according to the formula above, when the "Offset" value equals the "Decay period," the polling rate is once in (2^3) days or once in every 8 days. Assuming that the actual reduction of the polling rate begins after a five day grace period from the start of the decay period, and assuming a default 90 day "Decay Period Length," at one hour after the beginning of the decay period, the polling rate may be calculated as follows.

$2^{\wedge}(((1/24)/90)*3)=\sim$ once a day

After a week, the polling rate may be calculated as follows.

$2^{\wedge}((7/90)*3)=\sim 1.2$ days

After 30 days, the polling rate may be calculated as follows.

$2^{\wedge}((30/90)*3)=2$ days

After 60 days, the polling rate may be calculated as follows.

$2^{\wedge}((60/90)*3)=4$ days

After 90 days, the polling rate may be calculated as follows.

$2^{\wedge}((90/90)*3)=8$ days

After the ramp-down period is over, the polling of the server by the synchronizer is suspended.

As mentioned above, the polling of the server may be resumed and the decay (or ramp-down) period restarted in response to one or more predetermined events associated with the workflow. For example, the ramp-down period can be reset by an event like a detecting a new piece of data associated with the electronic document that is the subject of the workflow, detecting that the participant opened the document with the associated viewer application, etc. It will be noted, that different synchronizers associated with different workflow participants may operate at different stages of the ramp-down sequence, e.g., depending on the particular participant's level of participation in the collaborative workflow.

Returning to FIG. 3, the reset event detector 260 determines, at operation 310, whether an event that was designated as a ramp-down period reset event occurred. If a reset event is detected at operation 310, the current polling rate is reset to an active polling rate at operation 312, the ramp-down period is restarted and the ramp-down sequence is re-initiated at operation 314. If no reset event is detected at operation 310, the throttling module 240 sets the polling rate to the polling rate calculated at operation 308. At operation 318, the decision module 270 determines whether the polling rate is to be adjusted, e.g., by detecting a rate change triggering event. A rate change triggering event may be, for example, based on the current date and/or time.

In one example embodiment, if a workflow participant opens the file that is part of the workflow during a ramp down period, the polling of the server associated with the workflow is resumed and the ramp down period is reset in order to permit the participant to access the latest workflow information. Additionally, at any point if new workflow information is found on the server the ramp-down sequence is restarted.

In one example embodiment, method and system to manage document workflow communication may be utilized advantageously to permit recovery from an unreliable server. For example, if the workflow information is removed from the server (e.g., as the result of an error), the synchronizer on the client system may automatically enter an "ended" state and commence the ramp-down sequence. If the workflow information is restored on the server, then all of the participants' respective clients may recover from the server failure, enter an active sate), and restart the ramp-down period as described above.

The operations 308-318 may be repeated in the method 300 of FIG. 3 until the collaborative document workflow is ended by the initiator. In one example embodiment, a request to end the workflow to suspend polling, or to initiate a ramp-down sequence may originate from a system associated with the workflow initiator (e.g., the server system or another client system).

It will be noted that, although some example embodiments of the invention have been described with reference to an electronic document in a Portable Document Format, the techniques herein may be utilized advantageously with a variety of applications related to providing electronic documents to users.

Figure 4:
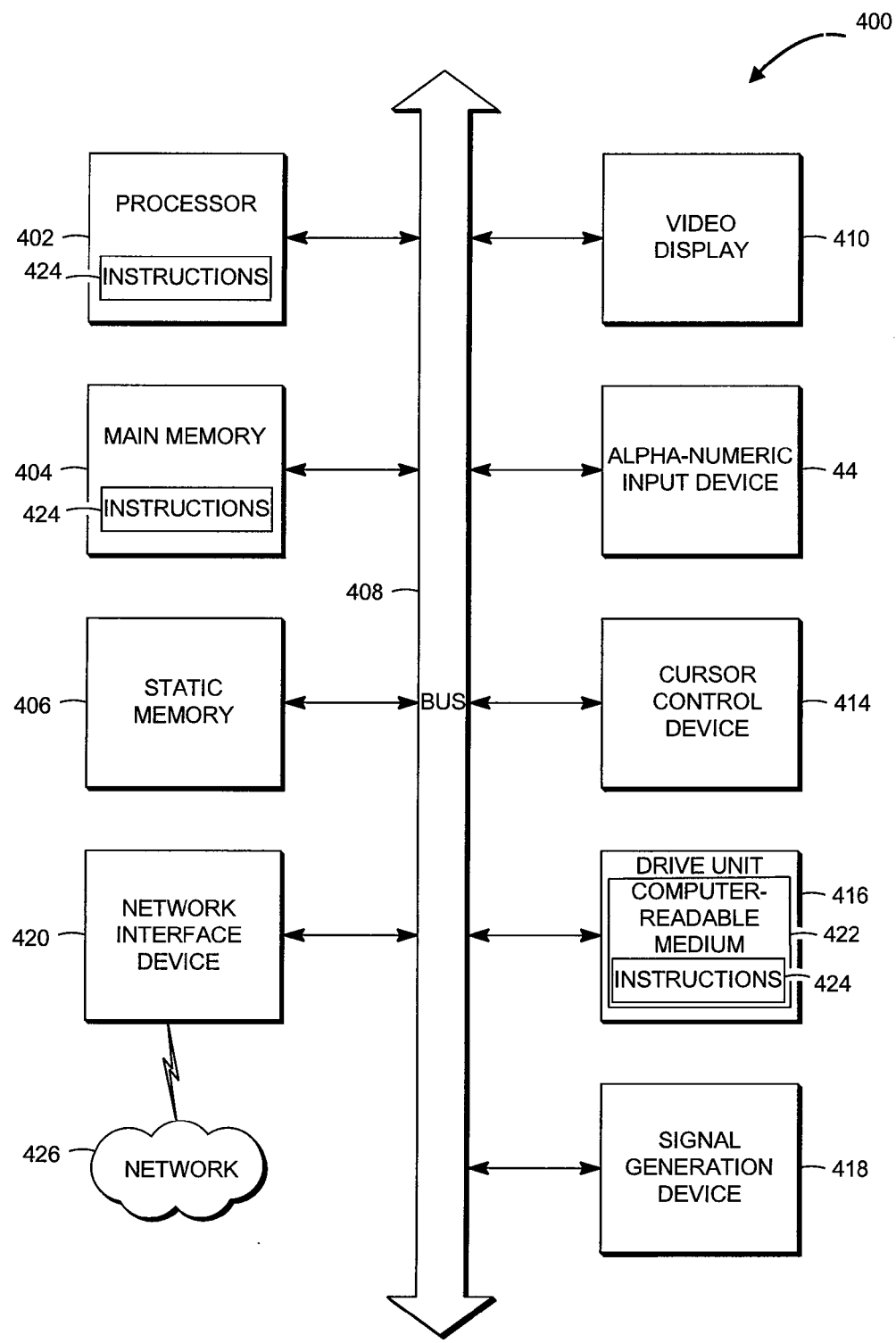
FIG. 4 illustrates a diagrammatic representation of a machine in the example form of a computer system within which a set of instructions, for causing the machine to perform any one or more of the methodologies discussed herein, may be executed.

FIG. 4 shows a diagrammatic representation of a machine in the example electronic form of a computer system 400 within which a set of instructions, for causing the machine to perform any one or more of the methodologies discussed herein, may be executed. In various embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a portable music player (e.g., a portable hard drive audio device such as an MP3 player), a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 400 includes a processor 402 (e.g., a central processing unit (CPU), a graphics processing unit (GPU) or both), a main memory 404 and a static memory 406, which communicate with each other via a bus 408. The computer system 400 may further include a video display unit 410 (e.g., a liquid crystal display (LCD) or a cathode ray tube (CRT)). The computer system 400 also includes an alphanumeric input device 412 (e.g., a keyboard), a user interface (UI) navigation device 414 (e.g., a mouse), a disk drive unit 416, a signal generation device 418 (e.g., a speaker) and a network interface device 420.

The disk drive unit 416 includes a machine-readable medium 422 on which is stored one or more sets of instructions and data structures (e.g., software 424) embodying or utilized by any one or more of the methodologies or functions described herein. The software 424 may also reside, completely or at least partially, within the main memory 404 and/or within the processor 402 during execution thereof by the computer system 400, the main memory 404 and the processor 402 also constituting machine-readable media.

The software 424 may further be transmitted or received over a network 426 via the network interface device 420 utilizing any one of a number of well-known transfer protocols (e.g., HTTP).

While the machine-readable medium 422 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Such medium may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware.

Although embodiments have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A system comprising:
    a memory; and
    one or more processors coupled to the memory, the one or more processors implementing:
        a polling module to poll a server at an active polling rate to obtain resources associated with a workflow of an electronic document,
        a ramp-down trigger detector to detect a workflow ramp-down trigger event, and
        a throttling module to initiate a ramp down of the polling of the server according to a ramp-down schedule.

2. The system of claim 1, wherein the electronic document workflow is associated with collaborative review of the electronic document.

3. The system of claim 2, wherein the resources associated with the electronic document workflow comprise one or more reviewer comments.

4. The system of claim 2, wherein the electronic document is in a Portable Document Format (PDF).

5. The system of claim 1, wherein the workflow ramp-down trigger event is associated with reaching a deadline for completing a collaborative review of the electronic document.

6. The system of claim 1, wherein the workflow ramp-down trigger event is associated with an indication that the server is not available.

7. The system of claim 1, comprising:
    a reset event detector to detect a reset event associated with the electronic document workflow; and
    responding to the reset event by resetting a current rate of polling of the server to the active polling rate; and
    reinitiating a ramp down of the polling of the server according to the ramp-down schedule.

8. The system of claim 7, wherein the reset event is associated with opening of the electronic document with a viewing application.

9. The system of claim 7, wherein the reset event is associated with obtaining from the server of a resource associated with the electronic document workflow.

10. A method comprising:
    polling a server at an active polling rate to obtain resources associated with a workflow of an electronic document;
    detecting a workflow ramp-down trigger event; and
    responding to the detecting of the workflow ramp-down trigger event by initiating a ramp down of the polling of the server according to a ramp-down schedule.

11. The method of claim 10, wherein the electronic document workflow is associated with collaborative review of the electronic document.

12. The method of claim 11, wherein the resources associated with the electronic document workflow comprise one or more reviewer comments.

13. The method of claim 11, wherein the electronic document is in a Portable Document Format (PDF).

14. The method of claim 10, wherein the workflow ramp-down trigger event is associated with reaching a deadline for completing a collaborative review of the electronic document.

15. The method of claim 10, wherein the workflow ramp-down trigger event is associated with an indication that the server is not available.

16. The method of claim 10, comprising:
    detecting a reset event associated with the electronic document workflow; and
    responding to the reset event by resetting a current rate of polling of the server to the active polling rate; and
    reinitiating a ramp down of the polling of the server according to the ramp-down schedule.

17. The method of claim 16, wherein the reset event is associated with opening of the electronic document with a viewing application.

18. The method of claim 16, wherein the reset event is associated with obtaining from the server of a resource associated with the electronic document workflow.

19. The method of claim 10, comprising completing the ramp-down of the polling of the server by suspending of the polling of the server.

20. The method of claim 10, wherein the workflow ramp-down trigger event is associated with a request from the server.

21. A machine-readable non-transitory storage medium having instruction data to cause a machine to:
    poll a server at an active polling rate to obtain resources associated with a workflow of an electronic document;
    detect a workflow ramp-down trigger event; and
    initiate a ramp down of the polling of the server according to a ramp-down schedule.

* * * * *